United States Patent
McIntosh et al.

(10) Patent No.: US 6,358,458 B1
(45) Date of Patent: Mar. 19, 2002

(54) SPINNING AND STABILITY OF SOLUTION-DYED NYLON FIBERS

(75) Inventors: Stanley A. McIntosh, Candler; Harry Y. Hu, Arden; Bobby J. Bailey, Candler, all of NC (US); O. Keith Gannon, Sterling, KY (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/438,728

(22) Filed: Nov. 11, 1999

Related U.S. Application Data

(62) Division of application No. 09/041,031, filed on Mar. 11, 1998, now Pat. No. 6,136,433
(60) Provisional application No. 60/045,269, filed on May 1, 1997.

(51) Int. Cl.[7] ............................... D01F 1/04; D06P 3/24
(52) U.S. Cl. .............................. 264/406; 8/497; 8/568; 264/78; 264/211
(58) Field of Search ................................. 264/78, 176.1, 264/211, 406; 8/497, 568

(56) References Cited

U.S. PATENT DOCUMENTS

| | | |
|---|---|---|
| 3,929,725 A | 12/1975 | Davis |
| 3,947,424 A | 3/1976 | Tomek |
| 4,153,596 A | 5/1979 | Oertel et al. |
| 4,374,641 A | 2/1983 | Burlone |
| 4,756,947 A | 7/1988 | Nishikawa et al. |
| 4,874,391 A | 10/1989 | Reinert |
| 4,964,875 A | 10/1990 | Hendricks et al. |
| 5,280,088 A | 1/1994 | Gambale et al. |
| 5,466,761 A | 11/1995 | Scheetz et al. |
| 5,618,909 A | 4/1997 | Lofquist et al. |
| 5,736,468 A | 4/1998 | Elgarby |
| 5,756,407 A | 5/1998 | Elgarby et al. |
| 5,807,972 A | 9/1998 | Liedloff et al. |
| 5,814,107 A | 9/1998 | Gadoury et al. |
| 5,830,572 A | 11/1998 | Anton et al. |
| 5,851,238 A | 12/1998 | Gadoury et al. |

FOREIGN PATENT DOCUMENTS

| | | |
|---|---|---|
| DE | 26 42 461 A1 | 3/1978 |
| DE | 38 23 112 A1 | 1/1990 |
| DE | 3901717 A1 | 7/1990 |
| DE | 195 37 614 A1 | 4/1997 |
| EP | 466 647 A1 | 1/1992 |
| EP | 516 192 A2 | 12/1992 |
| EP | 546 993 A1 | 6/1993 |
| EP | 704 560 A1 | 4/1996 |
| FR | 2642764 | 10/1990 |
| GB | 2220418 A | 1/1990 |
| JP | 9-41217 | 2/1997 |
| JP | 9-41218 | 2/1997 |
| RU | 670588 | 6/1979 |
| WO | WO 90/09408 | 8/1990 |
| WO | WO 95/28443 | 10/1995 |
| WO | WO 97/05189 | 2/1997 |

OTHER PUBLICATIONS

Herbst and Hunger. "Industrial Organic Pigments", 1993, pp. 467–475.

*Primary Examiner*—Leo B. Tentoni

(57) ABSTRACT

Stabilized solution-dyed fiber is made by melting a polyamide which is amide monomers polymerized in the presence of at least one hindered piperidine compound, coloring the melted polyamide, and spinning the colored polyamide into fibers that have about 40% or better retained tenacity after 2125 kJ exposure to xenon arc radiation as per AATCC Test Method 16-1993, "Colorfastness to Light," Option E. Copper stabilizers are unnecesssary.

16 Claims, 2 Drawing Sheets

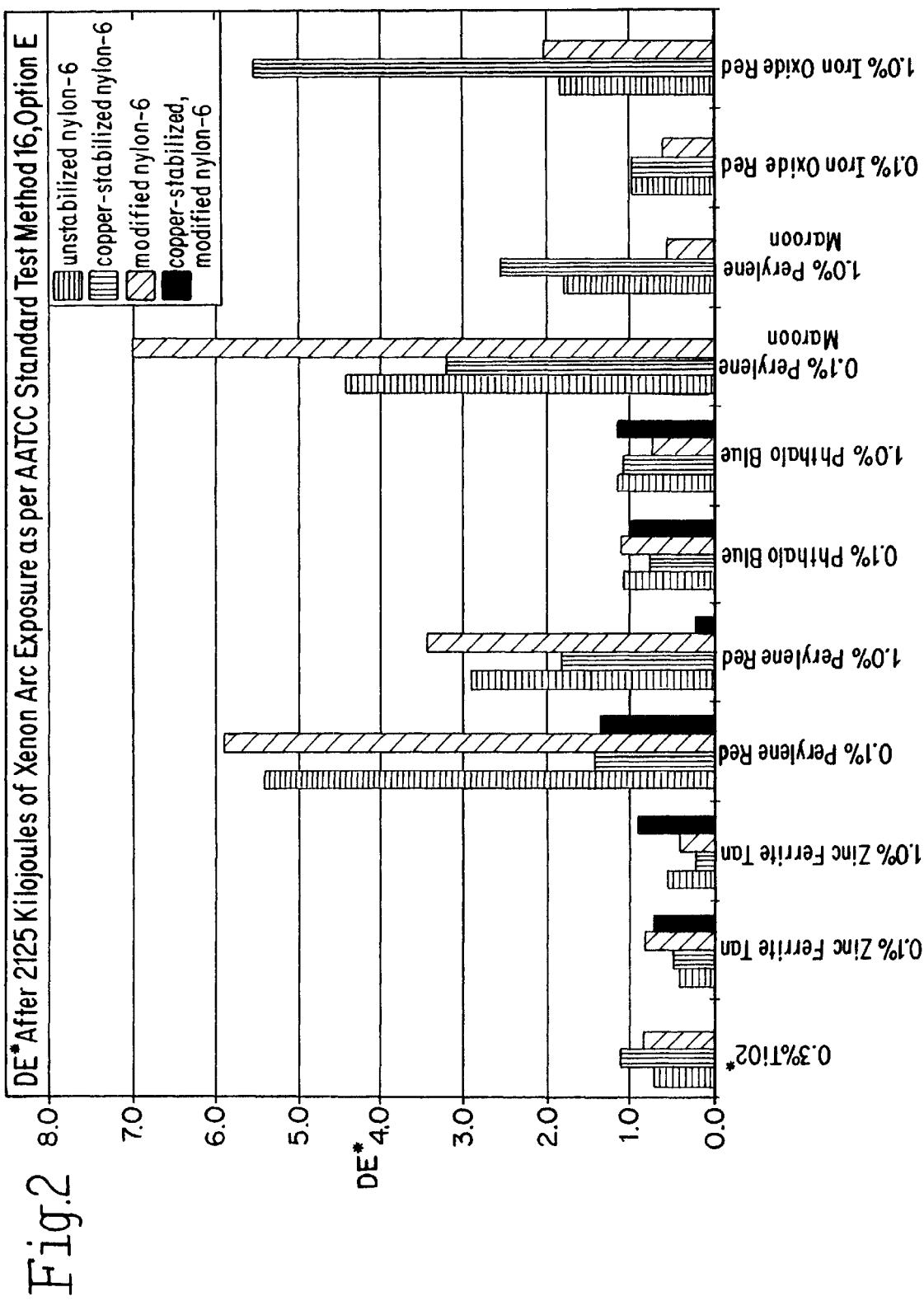

SPINNING AND STABILITY OF SOLUTION-DYED NYLON FIBERS

CROSS-REFERENCE TO RELATED APPLICATIONS

This application is a divisional of and claims the benefit of U.S. Pat. No. 6,136,433, which issued from application Ser. No. 09/041,031, filed Mar. 11, 1998, which in turn claims the benefit of U.S. Provisional Application Ser. No. 60/045,269, filed May 1, 1997.

FIELD OF THE INVENTION

The present invention relates to spinning fibers from thermoplastic polymers. More specifically, the present invention relates to spinning thermoplastic fibers that are colored in the melt, i.e., solution-dyed.

BACKGROUND OF THE INVENTION

As used herein, certain terms have the meanings ascribed to them.

"Colorant" means a compound added to impart color to a substrate. Colorants can be, for example, pigments or dyes or mixtures of pigments, dyes, etc.

"Spiriting efficiency" means the percentage of time that the winder is collecting yarn ("up time") with respect to the total operating time, i.e., (up time/total time)×100.

"Solution-dyed" means that color is added to a fiber-forming material prior to extruding it into a fiber through a spinneret capillary.

It is known that, unaided, nylon fibers are not sufficiently light resistant for certain applications. For these nylon fibers, exposure to light causes the fiber to discolor and/or to lose physical properties. Light stabilizers have been incorporated in the nylon polymer to address this problem.

There are several classes of light stabilizers. As additives, organic stabilizers (such as hindered phenols) are expensive and have limited effectiveness.

Inorganic salts are generally less expensive and more effective than organic stabilizers but suffer from a different set of problems. For example, copper compounds are inexpensive relative to organic stabilizers but form copper deposits in pipes, spin packs, extruders and other equipment because some of the copper ions reduce to elemental copper during the spinning process. This phenomenon is described in U.S. Pat. No. 3,929,725 to Davis and U.S. Pat. No. 3,947,424 to Tomek. Copper deposits cause spinning difficulties and add significant equipment maintenance expense. Furthermore, the removal of copper deposits generates environmentally undesirable effluent.

A class of stabilizers is known as "hindered amine light stabilizers" or by the acronym "HALS". HALS stabilizer additives may be added to the polymer after polymerization in the form of monomers, low molecular weight additives or incorporated into a polymer backbone. Such stabilizers are typically high cost and low effectiveness compared to copper based stablizers. In addition, the polymer itself has been modified by polymerizing the amide monomers in the presence of a HALS type of compound. This has been described in WO 95/28443.

It is known to solution-dye nylon fibers. For example, solution-dyed nylon fibers are described in U.S. Pat. No. 4,374,641 to Burlone. The problem of light stability is complicated by solution-dyeing. Some colorants actually accelerate the degradation of the host polyamide. Without stabilizing additives, the fiber loses an unacceptable degree of strength during exposure to light or the colorant does not remain "true" to its color. Proper stabilizer selection is made tricky, to say the least. For example, certain pigments are taught to be incompatible with HALS stabilizers. See W. Herbst and K. Hunger, "Industrial Organic Pigments" Verlagsgesellschaft mbH, Federal Republic of Germany, 1993, pp. 467–475.

Although WO 95/28443 describes addition of $TiO_2$ and possibly other colorants, this addition is during the polymerization phase. In the manufacture of a palette of solution-dyed yarns, it is not practical to use polymer that is already colored (not delustered) in polymerization. It should be apparent that the color of the polymer will interfere with the fiber spinner's ability to make a broad spectrum of colors.

In addition, certain colorants or classes of colorants are notoriously difficult to spin and operators experience frustating breaks during the spinning process. Any method that improves the spinning efficiency of solution-dyed fibers colored with these materials is desirable.

Therefore, there remains a need for an inexpensive method for making a variety of colors in solution-dyed nylon fibers that are stabilize with respect to the polyamide and to the colorant. Such a method should not have any of the disadvantages that are described above.

SUMMARY OF THE INVENTION

It is an object of the present invention to provide a process for making a light stabilized solution-dyed fiber.

It is another object of the present invention to provide improved efficiency for traditionally difficult to spin solution-dyed fibers.

A further object of the present invention is to eliminate or significantly reduce stabilizer build-up in melt spinning lines.

A still further objective of the present invention is to provide a light stabilized solution-dyed fiber.

Yet, another object of the present invention is to provide an environmentally-friendly, efficient process for producing solution-dyed nylon fibers.

These object are achieved in a process for making stabilized, solution-dyed fiber by melting a polyamide which is amide monomers polymerized in the presence of at least one hindered piperidine compound having the formula:

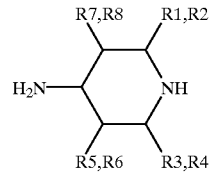

where R1, R2, R3 and R4 are not hydrogen, but are any alkyl group having up to about 20 carbon atoms, and R5, R6, R7 and R8 are any alkyl group having up to 20 carbon atoms or hydrogen and, optionally, at least one mono or dicarboxylic acid chain regulator; and coloring the melted polyamide with a colorant selected from the group consisting of: pigments that are not pure iron oxide pigments; dyes; and mixtures thereof.

The colored polyamide is spun into fibers that have about 40% or better retained tenacity after 2125 kJ exposure to xenon arc radiation as per AATCC Test Method 16-1993, "Colorfastness to Light," Option E and that contain no more than about 10 ppm uncomplexed copper.

In another aspect, the present invention includes a light stabilized solution-dyed nylon fiber. The fiber is a polyamide host polymer which is amide monomers polymerized in the presence of at least one hindered piperidine compound having the formula:

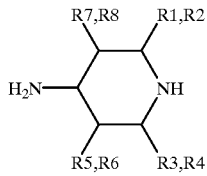

where R1, R2, R3 and R4 are not hydrogen, but are any alkyl group having up to about 20 carbon atoms, and R5, R6, R7 and R8 are any alkyl group having up to about 20 carbon atoms or hydrogen and, optionally, at least one mono or dicarboxylic acid chain regulator; and a non-white colorant dispersed throughout the host polymer. Such fiber is substantially free from copper compounds.

Related object and advantages of the present invention will be apparent to those of ordinary skill in the art after reading the following detailed description.

BRIEF DESCRIPTION OF THE DRAWINGS

FIG. 2 is a bar chart comparing the color change after xenon light (UV) exposure of fibers made according to the invention (i.e., with modified nylon 6) to other fibers (i.e., unstabilized nylon 6 and copper stabilized nylon 6).

DETAILED DESCRIPTION OF THE PREFERRED EMBODIMENTS

Figure 1:
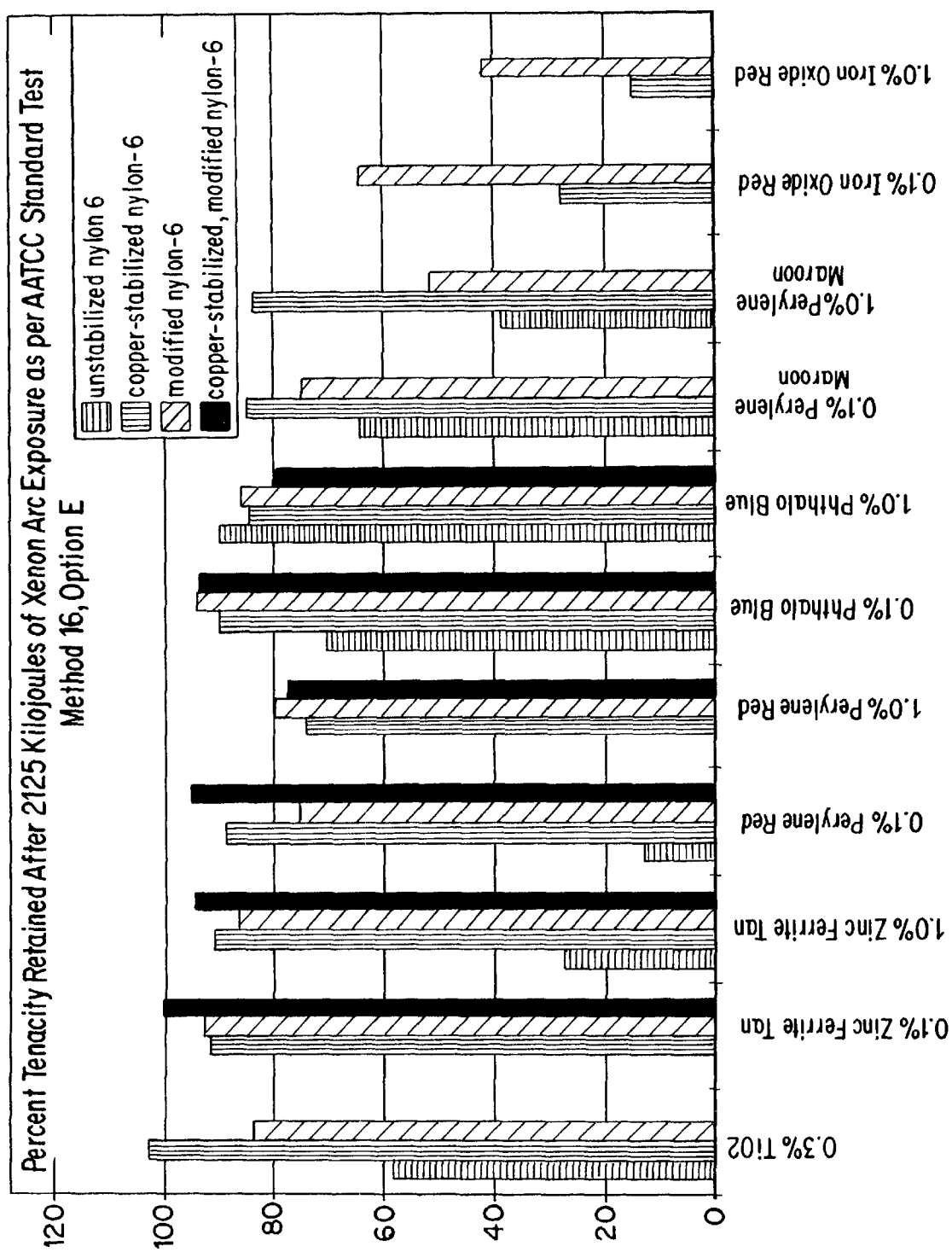
FIG. 1 is a bar chart comparing the retained tenacity after xenon light (UV) exposure of fibers made according to the invention (i.e., with modified nylon 6) to other fibers (i.e., unstabilized nylon 6 and copper stabilized nylon 6).

To promote an understanding of the principles of the present invention, descriptions of specific embodiments of the invention follow and specific language is used to describe the same. It will be understood that no limitation of the scope of the invention is intended by the use of this specific language and that alterations, modifications, equivalents and further applications of the principles of the invention discussed are contemplated as would normally occur to one ordinarily skilled in the art to which the invention pertins.

One aspect of the present invention is a process for making light stabilized solution-dyed fiber. A modified nylon containing a hindered amine light stabilizer (HALS) functionality built into the nylon molecule is used. The result is a surprisingly stable fiber product, even in the presence of strongly pro-degrading pigments. The invention significantly reduces dependence on stabilizer additives for solutions-dyed nylon production.

The process of the present invention includes melting a certain polyamide. The melted polyamide is colored with a colorant and spun into fibers. After spinning, the fibers are quenched, and optionally, drawn, textured and taken up according to typical procedures that are well known in the art.

The fibers made by this process are useful in any of the common applications for polyamide fibers. These applications include (but are not limited to) apparel, carpeting, upholstery, etc.

The certain polyamide used in the present invention is made by hydrolytically polymerizing nylon forming monomers or co-monomers (e.g., those used to make nylons such as nylon 6, nylon 6/6, nylon 12, nylon 6/12, nylon 11, etc.), preferably, ε-caprolactam; in the presence of water, at least one hindered piperidine derivative and, optionally, at least one mono or dicarboxylic acid chain regulator. In the description of the invention, nylon 6 and caprolactam are used as specific examples of the invention. While this embodiment of the invention is presently preferred, it should not be considered limiting. The exemplary nylon may be made by polymerizing ε-caprolactam in the presence of at least one copolymerizable hindered amine (piperidine) compound of the formula:

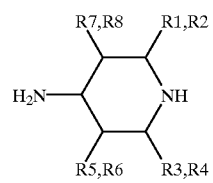

where R1, R2, R3, and R4 are not hydrogen, but are any alkyl group such as methyl, ethyl, propyl, isopropyl, butyl, etc., having up to about 20 carbon atoms. R5, R6, R7, and R8 are any alkyl group having up to about 20 carbon atoms or hydrogen. The R1–8 may be all the same; they may all be different; or they may be some combination thereof. It is contemplated that the alkyl groups may be substituted alkyl groups. Such substitution is included within the scope of "alkyl."

The hindered piperidine derivative is preferably an amino polyalkylpiperidine. Preferably, the hindered piperidine derivative is a 2,2',6,6'-tetraalkylpiperidine (sometimes referred to as "TAD" or "triacetone diamine") Exemplary useful hindered piperidine compounds include:

4-amino-2,2',6,6'-tetramethylpiperidine;
4-(aminoalkyl)-2,2',6,6'-tetramethylpiperidine;
4-(aminoaryl)-2,2',6,6'-tetramethylpiperidine;
3-amino-2,2',6,6'-tetramethylpiperidine;
3-(aminoalkyl)-2,2',6,6'-tetramethylpiperidine;
3-(aminoaryl)-2,2'6,6'-tetramethylpiperidine;
2,2',6,6'-tetramethyl-4-piperidinecarboxylic acid;
2,2',6,6'-tetramethyl-4-piperidinealkylcarboxylic acid;
2,2',6,6'-tetramethyl-4-piperidinearylcarboxylic acid;
2,2',6,6'-tetramethyl-3-piperidinecarboxylic acid;
2,2',6,6'-tetramethyl-3-piperidinealkylcarboxylic acid; and
2,2',6,6'-tetramethyl-3-piperidinearylcarboxylic acid.

The hindered amine compound may be mixtures of these (or of these and other hindered amines) as well. To make the polyamide used in the present invention, the hindered amine compound is added to the starting monomers or to the polymerizing reaction mixture. The polymerization is preferably carried out according to a range of conventional conditions for polymerizing the type of amide monomer, e.g., caprolactam to make nylon 6. The hindered amine compound is added to the starting monomers at from about 0.03 to about 0.8 mol %, preferably from about 0.06 to about 0.4 mol % (in relation to 1 mole amide groups of the polyamide).

The hindered amine compound may be used with at least one chain regulator. Suitable chain regulators are, for example, monocarboxylic acids such as acetic acid, propionic acid and benzoic acid; and dicarboxylic acids.

Preferred dicaboxylic acid chain regulators are selected from the group of $C_{4-C10}$ alkane dicarboxylic acids (e.g., adipic acid, sebacic acid, cyclohexane-1, 4-dicarboxylic acid); benzene and naphthalene dicarboxylic acids (e.g., isophthalic acid, terephthalic acid and naphthalene 2,6-dicarboxylic acid); and combinations thereof. Preferably, the dicarboxylic acid chain regulator is terephthalic acid, sebacic acid or adipic acid. The preferable amount of dicarboxylic acid used is from 0.06 to 0.6 mole % in relation to 1 mole amide groups.

Water is preferably used as a polymerization initiator. The amount of water used as an initiator may vary but is typically about 0.4 wt. % based on the weight of the ε-caprolactam monomer.

When the amide monomer is ε-caprolactam, exemplary polymerization conditions are from about 240° C. to about 290° C. for about 8 to about 12 hours at pressure conditions of from about 1.0 to about 1.9 bar. The pressure is measured in the vapor phase above the polymerization zone.

The polyamide made in this way is fed to an extruder that may be any extruder used in the art for spinning fibers. Typically, such extruders melt the polyamide over several stages. The melt temperature will depend somewhat on the polyamide used but will generally be in the range from about 240° C. to about 290° C.

The melted polyamide is colored with a colorant selected from the group consisting of pigments, dyes, as well as any colored compound with properties in between pigments and dyes and combinations or mixtures of any of these. Especially preferred colorants include those that are considered difficult to spin due to breaks (decreed spinning efficiency). These colorants include transparent iron oxide red, zinc ferrite tan, and titanium dioxide. It should be noted that pure iron oxide pigment (i.e., iron oxide that is not used with other colorants), which yields a red color, is not included in the list of pigments that are used in the present invention. Other colorants where iron oxide is only one of the colorants in a mixture of pigments, are included in the colorants used in the present invention. In such colorants, iron oxide may typically be included at up to about 1.5% by weight of the colorant.

The colored polyamide is spun into fibers according to techniques known to those of ordinary skill in the art. It is not deemed limiting to use any specific method of spinning. The polyamide may be spun into fibers as a monocomponent filament or as one component of a multicomponent filament. The fiber may have any of the variety of cross-sections made in the art. For example, the fiber may be round, mutilobal (e.g., trilobal), deltoid, pentagonal, etc.

The denier of the fiber will depend on its intended end use and is not considered limited by the invention. The denier may be very fine, e.g, about 0.1 denier per filament or very large, e.g., about 50 denier or more per filament.

The present invention surprisingly produces solution-dyed fibers wherein the polyamide and the colorant are both stabilized from degradation by light. With the present invention, t is not considered necessary to use other stabilizers as additives. For example, it is not necessary to use coper salts as stabilizing aciditives. Copper compounds may be present in the fiber because, for example, some pigments (e.g., phthalocyanine blue) are copper complexes. The present invention results in a fiber having a 40% or better retained tenacity after 2125 kJ exposure to xenon arc radiation per AATCC Test Method 16-1993 "Colorfastness to Light" Option E and even when containing no more than about 10 ppm uncomplexed copper. The elimination of such stabilizing additives reduces equipment maintenance costs and eliminates harmful effluents produced in the removal of stabilizer deposits in spinning equipment.

Even more surprising is the increased spinning efficiency noted with certain difficult to spin colorants. Spinning efficiency is preferably increased by at least about 0.5%. Such increases in spinning efficiency can translate into hundreds of thousands of dollars in reduced annual manufacturing costs. Example 6 below demonstrates some of the improved efficiency observed with the present invention.

Of course, various non-stabilizing additives may be used in one or more of the filaments. These include, without limitation, lubricants, nucleating agents, antioxidants, antistatic agents, etc.

Another aspect of the present invention is a light stabilized solution-dyed nylon fiber that is made from a polyamide host polymer which includes amide monomers polymerized in the presence of at least one hindered piperidine compound having the formula:

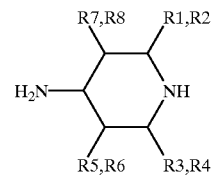

where R1, R2, R3 and R4 are not hydrogen, but are any alkyl group having up to about 20 carbon atoms. R5, R6, R7 and R8 are any alkyl group having up to about 20 carbon atoms or hydrogen R1–8 may each be the same group; may each be a different group and, optionally, at least one mono or dicarboxylic acid chain regulator, or some combination thereof. It is contemplated that the alkyl groups may be substituted and such substitution is included in the scope of "alkyl."

A non-white colorant is dispersed throughout the host polyamide. This fiber may be made according to the process described above. It may have the characteristics attributed to fibers made by the process.

This invention will be described by reference to the following detailed examples. The examples are set forth by way of illustration, and are not intended to limit the scope of the invention. All percentages are by weight unless otherwise noted.

In the following Examples, the following standardized test methods are used:

Xenon Arc (Ultraviolet light ("UV")) Exposure

Knit tubes are exposed according to AATCC Test Method 16-1990, Option E: "Water-Cooled Xenon-Arc Lamp, Continuous Light" to 2125 kJ (500 hours) in 425 kJ (100 hour) increments.

Following exposure, the tenacity of the samples is measured by the single strand method wherein single strand yarn specimens are broken at a constant rate of extension using an Instron tensile testing machine.

Ozone and $NO_x$ Exposure

Knit tubes are tested according to *AATCC Test Method 129-1996, "Colorfastness to Ozone in the Atmosphere Under High Humidities"* and *AATCC Test Method 164-1992, "Colorfastness to Oxides of Nitrogen in the Atmosphere Under High Humidities"*. Data in the form of total color difference (DE*) is collected at 1, 2, 3, 4, 6 and 8 cycles.

Total Color Difference (DE*)

Color measurements are made using Applied Color Systems (ACS) Spectrophotometer generating 1976 CIE LAB (D6500 illuminant, 10 degree observer) values. Delta E ("ΔE" or "DE*" total color difference) calculations are made against unexposed controls. Details of CIE LAB measurements and calculation of total color difference (Delta E) are found in the color science literature, for example, Billmeyer and Saltzman, *Principles of Color Technology*. 2nd Edition, J. Wiley & Sons, New York, (1981). Larger Delta E values indicate more color change and, therefore, more degradation in the colored fiber properties. CIE LAB color data is composed of measurements along three axes in three dimensional space. L* is a quantification of lightness. Higher values are lighter. a* is the red-green axis with positive numbers being more red. b* is the yellow-blue axis with positive numbers being more yellow.

EXAMPLES 1A–1I COMPARATIVE (Solution-Dyed Nylon Fibers—Nylon Host Polymer-No Stabilizer)

Using a small scale extruder with a 1" diameter screw, solution-dyed 715/14 (yarn denier/no. of filaments) trilobal yarns are spun without any light stabilization using standard unmodified nylon 6 host polymer (BS700F available from BASF Corporation, Mt. Olive, N.J.) (RV=2.7 as measured in sulfuric acid). Yarn extrusion conditions are:

| | |
|---|---|
| Zone 1 | 240° C. |
| Zone 2 | 260° C. |
| Zone 3 | 270° C. |
| Polymer temperature | 270° C. |
| Throughput | 30 grams/minute |
| Winder | 371 meters/minute take-up |
| Finish | 0.90% finish on yarn |

Pigments are added to the nylon 6 host polymer prior to yarn extrusion as the concentrates described in TABLE 1. Before addition to the host polymer, concentrate chips are first ground with a Wiley Mill and then bag blended with a similarly ground nylon 6 base polymer.

TABLE 1

| Example | Pigment | Carrier | % Pigment in Carrier | Pigment Loading in Fiber |
|---|---|---|---|---|
| 1A | anatase titanium dioxide | nylon 6 | 30% | 0.3% |
| 1B | zinc ferrite tan | nylon 6 | 25% | 0.1% |
| 1C | zinc ferrite tan | nylon 6 | 25% | 1.0% |
| 1D | pigment blue 15:1 | nylon 6 | 25% | 0.1% |
| 1E | pigment blue 15:1 | nylon 6 | 25% | 1.0% |
| 1F | pigment red 149 | nylon 6 | 25% | 0.1% |
| 1G | pigment red 149 | nylon 6 | 25% | 1.0% |
| 1H | pigment red 179 | nylon 6 | 15% | 0.1% |
| 1I | pigment red 179 | nylon 6 | 15% | 1.0% |

The yarn is drawknit at a 3.25 draw ratio on a Lawson-Hemphill HDK knitter to make 220/14 flat-knit tube product.

Knit tubes are tested for xenon arc, $NO_x$ and ozone exposure according to the AATCC methods indicated above. The strength retention data for xenon arc (UV) exposure are presented in TABLES 3 and 4. The color change (DE*) data for $NO_x$ and ozone exposure are presented in TABLE 5.

EXAMPLE 2A–2I COMPARATIVE (Solution-Dyed Nylon Fibers—Nylon 6 Host Polymer-Stabilized with Cooper)

Examples 2A–2I correspond respectively to Examples 1A–1I except that a copper light stabilizing compound is added to the bag blended concentrate as needed to produce 0.01% in nylon fiber.

Knit tubes are exposed and tested for Xenon arc, $NO_x$ and ozone exposure. The data are presented in TABLES 3–5.

EXAMPLES 3A–3I INVENTION (Solution-Dyed Nylon Fibers—Modified Nylon Host Polymer)

Examples 3A–3I correspond respectively to Examples 1A–1I except that the nylon host polymer is caprolactam polymerized in the presence of 2,2',6,6'-tetraalkylpiperidine using terephthalic acid as a chain regulator.

Knit tubes are exposed and tested for Xenon arc, $NO_x$ and ozone exposure. The data are presented in TABLES 3–5.

EXAMPLES 4B–4G (Solution-Dyed Nylon Fibers—Modified Nylon Host Polymer-Copper Stabilizer Added)

Examples 4B–4G correspond to Examples 3B–3G except that of a copper compound stabilizer is added to the bag blended pigment concentrate to yield 0.01% in nylon 6.

Knit tubes are exposed and tested for Xenon arc, $NO_x$ and ozone exposure. The data are presented in TABLES 3–5.

EXAMPLES 5A–5F COMPARATIVE (Pure Iron Oxide Pigment)

Examples 5A–5F are prepared according to Example 1 using the formulations shown in TABLE 2.

TABLE 2

| Example | Polymer | Pigment | Carrier | Pigment in Carrier (%) | Pigment in Fiber (%) | Copper Compound (%) |
|---|---|---|---|---|---|---|
| 5A | nylon 6 | iron oxide | polyethylene | 25 | 0.1 | 0 |
| 5B | nylon 6 | iron oxide | polyethylene | 25 | 1.0 | 0 |
| 5C | nylon 6 | iron oxide | polyethylene | 25 | 0.1 | 0.01 |
| 5D | nylon 6 | iron oxide | polyethylene | 25 | 1.0 | 0.01 |
| 5E | modified nylon 6* | iron oxide | polyethylene | 25 | 0.1 | 0 |
| 5F | modified nylon 6* | iron oxide | polyethylene | 25 | 1.0 | 0 |

*caprolactam polymerized in the presence of 2,2',6,6'-tetraalkylpiperidine using terephthalic acid as a chain regulator.

Knit tubes are exposed and tested for xenon arc, $NO_x$ and ozone exposure. The data are presented in TABLES 3–5.

TABLE 3

XENON ARC EXPOSURE (RETAINED TENACITY)

| Example | 425 kJ | 850 kJ | 1275 kJ | 1700kJ | 2125 kJ |
|---|---|---|---|---|---|
| 1A | 90 | 77 | 69 | 59 | 58 |
| 1B | 77 | 36 | 22 | 0 | 0 |
| 1C | 86 | 73 | 59 | 42 | 28 |
| 1D | 91 | 84 | 73 | 66 | 70 |
| 1E | 102 | 93 | 102 | 92 | 90 |
| 1F | 112 | 65 | 44 | 21 | 13 |
| 1G | 77 | 41 | 25 | 10 | 0 |

TABLE 3-continued

XENON ARC EXPOSURE (RETAINED TENACITY)

| Example | 425 kJ | 850 kJ | 1275 kJ | 1700kJ | 2125 kJ |
|---|---|---|---|---|---|
| 1H | 89 | 81 | 77 | 71 | 64 |
| 1I | 72 | 61 | 49 | 45 | 38 |
| 2A | 99 | 99 | 97 | 95 | 83 |
| 2B | 105 | 94 | 96 | 101 | 93 |
| 2C | 98 | 93 | 98 | 82 | 86 |
| 2D | 89 | 106 | 105 | 96 | 94 |
| 2E | 97 | 98 | 91 | 85 | 86 |
| 2F | 96 | 89 | 93 | 83 | 75 |
| 2G | 102 | 95 | 92 | 82 | 79 |
| 2H | 97 | 85 | 80 | 74 | 75 |
| 2I | 76 | 66 | 57 | 54 | 52 |
| 3A | 109 | 109 | 107 | 102 | 102 |
| 3B | 104 | 92 | 96 | 91 | 91 |
| 3C | 97 | 84 | 93 | 91 | 91 |
| 3D | 98 | 96 | 98 | 94 | 89 |
| 3E | 100 | 92 | 93 | 84 | 84 |
| 3F | 104 | 100 | 92 | 90 | 89 |
| 3G | 85 | 89 | 86 | 80 | 74 |
| 3H | 88 | 89 | 83 | 88 | 85 |
| 3I | 105 | 98 | 85 | 86 | 84 |
| 4B | 109 | 107 | 105 | 103 | 100 |
| 4C | 101 | 97 | 90 | 96 | 94 |
| 4D | 106 | 103 | 103 | 103 | 93 |
| 4E | 94 | 99 | 55 | 87 | 79 |
| 4F | 110 | 100 | 99 | 104 | 95 |
| 4G | 96 | 100 | 86 | 88 | 77 |
| 5A | 102 | 15 | 0 | 0 | 0 |
| 5B | 39 | 15 | 0 | 0 | 0 |
| 5C | 112 | 99 | 86 | 73 | 64 |
| 5D | 88 | 78 | 67 | 49 | 42 |
| 5E | 79 | 62 | 51 | 33 | 28 |
| 5F | 82 | 45 | 39 | 14 | 15 |

TABLE 4

XENON ARC EXPOSURE (COLOR CHANGE)

| Ex. | 0 kJ Exposure | | | 425 kJ Exposure | | | | 850 kJ Exposure | | | | 1275 kJ Exposure | | | | 1700 kJ Exposure | | | | 2125 kJ Exposure | | | |
|---|---|---|---|---|---|---|---|---|---|---|---|---|---|---|---|---|---|---|---|---|---|---|---|
| | L* | a* | b* | L* | a* | b* | DE* | L* | a* | b* | DE* | L* | a* | b* | DE* | L* | a* | b* | DE* | L* | a* | b* | DE* |
| 1A | 94.42 | −0.31 | 2.98 | 94.91 | −0.52 | 2.32 | 0.85 | 94.88 | −0.59 | 2.46 | 0.75 | 94.66 | −0.60 | 2.50 | 0.61 | 94.75 | −0.50 | 2.47 | 0.64 | 94.28 | −0.48 | 2.65 | 0.40 |
| 1B | 75.75 | 12.94 | 33.97 | 76.17 | 12.70 | 33.61 | 0.60 | 75.91 | 12.64 | 33.55 | 0.54 | 75.84 | 12.53 | 33.52 | 0.62 | 75.93 | 12.64 | 33.63 | 0.49 | 75.86 | 12.61 | 33.74 | 0.42 |
| 1C | 56.12 | 22.01 | 45.15 | 56.27 | 22.09 | 45.31 | 0.23 | 56.35 | 22.08 | 45.65 | 0.55 | 56.74 | 22.05 | 45.68 | 0.82 | 56.79 | 21.89 | 45.35 | 0.71 | 56.62 | 21.89 | 45.38 | 0.56 |
| 1D | 55.78 | −17.20 | −34.43 | 56.13 | −16.85 | −34.09 | 0.60 | 56.17 | −16.78 | −33.82 | 0.84 | 56.35 | −16.69 | −33.73 | 1.04 | 56.61 | −16.60 | −33.63 | 1.30 | 56.11 | −16.74 | −33.57 | 1.11 |
| 1E | 32.01 | −10.54 | −35.04 | 32.57 | −10.60 | −35.20 | 0.59 | 32.85 | −10.70 | −35.28 | 0.89 | 33.14 | −10.70 | −35.39 | 1.19 | 33.30 | −10.59 | −35.50 | 1.37 | 32.83 | −10.97 | −35.75 | 1.17 |
| 1F | 57.84 | 49.74 | 22.61 | 57.41 | 46.79 | 20.28 | 3.78 | 57.22 | 46.74 | 20.25 | 3.87 | 57.68 | 46.00 | 19.87 | 4.64 | 57.85 | 45.54 | 19.73 | 5.09 | 57.85 | 45.16 | 19.74 | 5.40 |
| 1G | 39.92 | 56.84 | 35.19 | 39.29 | 55.73 | 34.14 | 1.65 | 38.65 | 56.07 | 34.82 | 1.53 | 38.86 | 55.11 | 33.74 | 2.49 | 38.97 | 54.87 | 33.24 | 2.93 | 38.74 | 54.80 | 33.46 | 2.92 |
| 1H | 52.89 | 37.52 | 9.79 | 52.50 | 37.91 | 6.62 | 5.95 | 52.48 | 32.84 | 6.61 | 5.67 | 52.90 | 32.91 | 6.80 | 5.49 | 53.23 | 33.01 | 6.79 | 5.43 | 53.45 | 33.70 | 7.62 | 4.43 |
| 1I | 30.29 | 42.74 | 16.93 | 30.46 | 42.74 | 16.49 | 0.47 | 29.64 | 43.76 | 17.13 | 1.23 | 30.39 | 43.00 | 16.85 | 0.29 | 30.68 | 42.94 | 16.74 | 0.48 | 28.72 | 41.87 | 16.64 | 1.82 |
| 2A | 94.93 | −0.45 | 2.93 | 92.07 | −2.24 | 1.91 | 3.52 | 92.15 | −2.27 | 2.22 | 3.40 | 92.37 | −2.16 | 2.62 | 3.09 | 92.62 | −2.07 | 2.74 | 2.83 | 92.29 | −2.09 | 3.14 | 3.12 |
| 2B | 77.47 | 9.71 | 30.02 | 77.73 | 9.64 | 30.12 | 0.29 | 77.44 | 9.87 | 30.53 | 0.54 | 77.75 | 9.75 | 30.32 | 0.41 | 77.74 | 10.00 | 30.53 | 0.65 | 77.59 | 9.93 | 30.45 | 0.50 |
| 2C | 57.09 | 21.41 | 44.88 | 57.17 | 21.49 | 44.97 | 0.14 | 57.13 | 21.46 | 45.28 | 0.41 | 57.07 | 21.38 | 44.74 | 0.14 | 57.37 | 21.40 | 44.92 | 0.28 | 57.29 | 21.40 | 44.78 | 0.22 |
| 2D | 56.49 | −17.21 | −33.93 | 56.87 | −16.77 | −33.38 | 0.80 | 56.92 | −16.67 | −33.27 | 0.96 | 56.45 | −16.75 | −33.58 | 0.58 | 56.95 | −16.56 | −33.45 | 0.93 | 56.75 | −16.65 | −33.44 | 0.79 |
| 2E | 31.00 | −9.77 | −34.59 | 31.63 | −9.89 | −34.56 | 0.64 | 31.59 | −9.95 | −34.86 | 0.67 | 31.58 | −9.87 | −34.80 | 0.62 | 32.10 | −9.80 | −34.85 | 1.13 | 31.71 | −10.31 | −35.24 | 1.10 |
| 2F | 55.68 | 44.90 | 20.24 | 55.80 | 43.97 | 19.34 | 1.30 | 55.91 | 44.32 | 19.55 | 0.93 | 56.14 | 44.33 | 19.68 | 0.92 | 56.43 | 44.02 | 19.50 | 1.37 | 56.73 | 44.06 | 19.74 | 1.43 |
| 2G | 37.36 | 51.87 | 31.75 | 37.91 | 52.62 | 31.85 | 0.94 | 37.36 | 53.72 | 33.35 | 2.45 | 37.90 | 53.31 | 32.58 | 1.75 | 38.07 | 53.29 | 32.21 | 1.65 | 37.95 | 53.43 | 32.49 | 1.82 |
| 2H | 50.20 | 34.45 | 8.53 | 50.17 | 31.85 | 6.59 | 3.24 | 49.96 | 32.62 | 6.76 | 2.56 | 50.75 | 32.20 | 6.77 | 2.91 | 51.08 | 32.45 | 6.90 | 2.73 | 48.14 | 32.30 | 7.31 | 3.22 |
| 2I | 29.03 | 39.76 | 15.17 | 29.40 | 40.27 | 15.21 | 0.63 | 29.58 | 40.53 | 15.28 | 0.95 | 29.77 | 41.51 | 15.94 | 2.05 | 30.13 | 41.51 | 15.93 | 2.20 | 29.87 | 42.01 | 16.18 | 2.61 |
| 3A | 91.97 | −2.08 | 2.05 | 94.44 | −0.51 | 2.30 | 2.94 | 94.22 | −0.60 | 2.58 | 2.74 | 94.03 | −0.46 | 2.37 | 2.64 | 94.00 | −0.38 | 2.40 | 2.67 | 93.80 | −0.43 | 2.52 | 2.51 |
| 3B | 77.29 | 11.69 | 32.28 | 77.47 | 11.37 | 31.86 | 0.56 | 77.27 | 11.35 | 31.74 | 0.64 | 77.50 | 11.17 | 31.61 | 0.87 | 77.43 | 11.24 | 31.69 | 0.76 | 77.44 | 11.19 | 31.64 | 0.83 |
| 3C | 56.12 | 22.15 | 45.46 | 56.31 | 22.00 | 45.39 | 0.24 | 56.33 | 22.18 | 46.23 | 0.80 | 56.39 | 22.07 | 45.73 | 0.39 | 56.60 | 22.05 | 45.60 | 0.51 | 56.40 | 22.03 | 45.75 | 0.42 |
| 3D | 56.33 | −17.20 | −33.73 | 56.86 | −16.79 | −33.38 | 0.76 | 56.76 | −16.56 | −33.07 | 1.01 | 57.00 | −16.53 | −33.15 | 1.11 | 57.09 | −16.47 | −33.23 | 1.17 | 57.04 | −16.59 | −33.12 | 1.12 |
| 3E | 30.32 | −9.25 | −34.25 | 30.68 | −9.26 | −34.39 | 0.39 | 30.96 | −9.28 | −34.47 | 0.68 | 31.03 | −9.37 | −34.57 | 0.79 | 31.25 | −9.03 | −34.51 | 0.99 | 30.84 | −9.46 | −34.77 | 0.76 |
| 3F | 57.54 | 49.99 | 22.96 | 56.77 | 46.77 | 20.48 | 4.14 | 56.54 | 46.29 | 20.21 | 4.72 | 56.60 | 45.55 | 19.78 | 5.54 | 56.97 | 45.31 | 19.72 | 5.72 | 57.04 | 44.95 | 19.92 | 5.91 |
| 3G | 39.86 | 56.62 | 35.12 | 39.11 | 55.31 | 33.85 | 1.95 | 38.41 | 55.80 | 34.77 | 1.70 | 38.75 | 54.99 | 33.54 | 2.53 | 38.72 | 54.63 | 33.11 | 3.05 | 38.43 | 54.31 | 33.00 | 3.45 |
| 3H | 52.60 | 39.27 | 11.22 | 51.73 | 32.76 | 6.82 | 7.91 | 51.83 | 33.29 | 6.73 | 7.52 | 52.44 | 33.27 | 6.76 | 7.48 | 52.77 | 33.45 | 6.82 | 7.30 | 52.54 | 33.70 | 6.95 | 7.02 |
| 3I | 29.58 | 42.36 | 17.09 | 29.82 | 42.25 | 16.66 | 0.50 | 29.94 | 42.37 | 16.69 | 0.54 | 29.85 | 42.67 | 16.99 | 0.42 | 30.11 | 42.45 | 16.78 | 0.62 | 29.81 | 42.90 | 17.02 | 0.59 |
| 4B | 76.36 | 11.26 | 32.09 | 76.64 | 11.11 | 31.78 | 0.44 | 76.13 | 11.17 | 31.71 | 0.45 | 76.73 | 11.03 | 31.63 | 0.63 | 76.71 | 11.15 | 31.91 | 0.41 | 76.75 | 10.95 | 31.56 | 0.73 |
| 4C | 54.89 | 52.89 | 32.57 | 38.04 | 53.39 | 32.90 | 0.63 | 37.33 | 54.08 | 33.85 | 1.83 | 37.79 | 53.39 | 32.80 | 0.55 | 37.85 | 53.20 | 32.40 | 1.00 | 37.71 | 53.07 | 32.49 | 0.93 |
| 4D | 54.72 | 21.23 | 44.33 | 55.22 | 21.22 | 44.61 | 0.43 | 55.26 | 21.29 | 45.25 | 0.99 | 55.33 | 21.33 | 44.94 | 0.76 | 55.62 | 21.31 | 45.01 | 1.00 | 55.46 | 21.32 | 45.06 | 0.93 |
| 4E | 54.72 | −17.22 | −34.50 | 55.06 | −16.86 | −34.02 | 0.69 | 54.98 | −16.78 | −33.88 | 0.80 | 55.19 | −16.80 | −33.95 | 0.84 | 55.35 | −16.68 | −33.79 | 1.09 | 55.28 | −16.80 | −33.78 | 1.00 |
| 4F | 30.06 | −9.13 | −34.03 | 30.34 | −9.13 | −33.96 | 0.29 | 30.74 | −9.18 | −33.98 | 0.68 | 30.92 | −9.21 | −34.26 | 0.89 | 31.04 | −9.17 | −34.15 | 0.99 | 30.76 | −9.76 | −34.73 | 1.17 |
| 4G | 57.86 | 42.77 | 18.60 | 57.84 | 42.21 | 18.04 | 0.79 | 58.12 | 42.26 | 18.02 | 0.81 | 58.37 | 41.96 | 17.99 | 1.14 | 58.63 | 41.82 | 17.93 | 1.39 | 58.65 | 41.69 | 18.30 | 1.37 |
| 4H | 37.86 | 52.89 | 32.57 | 38.04 | 53.39 | 32.90 | 0.63 | 37.33 | 54.08 | 33.85 | 1.83 | 37.79 | 53.39 | 32.80 | 0.55 | 37.85 | 53.20 | 32.40 | 0.35 | 37.71 | 53.07 | 32.50 | 0.24 |
| 5A | 67.39 | 21.33 | 35.49 | 67.65 | 21.09 | 35.36 | 0.38 | 67.32 | 21.00 | 35.55 | 0.34 | 67.31 | 20.68 | 35.35 | 0.67 | 67.33 | 20.45 | 35.25 | 0.91 | 67.15 | 20.36 | 35.59 | 1.00 |
| 5B | 42.56 | 31.92 | 39.29 | 42.79 | 32.06 | 39.55 | 0.37 | 42.70 | 32.43 | 40.51 | 1.33 | 43.03 | 32.34 | 40.38 | 1.26 | 43.09 | 32.22 | 40.42 | 1.28 | 42.88 | 32.36 | 41.06 | 1.85 |
| 5C | 67.82 | 19.28 | 33.89 | 68.19 | 19.23 | 34.14 | 0.45 | 68.06 | 19.27 | 34.38 | 0.55 | 68.28 | 19.40 | 34.46 | 0.74 | 68.36 | 19.44 | 34.52 | 0.85 | 68.35 | 19.59 | 34.69 | 1.01 |
| 5D | 39.80 | 28.80 | 35.75 | 41.25 | 31.36 | 37.97 | 3.69 | 41.23 | 31.96 | 39.14 | 4.85 | 41.51 | 31.98 | 39.02 | 4.87 | 41.87 | 32.11 | 38.97 | 5.06 | 41.61 | 32.43 | 39.53 | 5.54 |
| 5E | 66.49 | 21.87 | 36.01 | 66.74 | 21.90 | 36.37 | 0.44 | 66.85 | 21.58 | 36.18 | 0.49 | 67.09 | 21.44 | 36.15 | 0.75 | 67.01 | 21.51 | 36.12 | 0.64 | 66.97 | 21.52 | 36.23 | 0.63 |
| 5F | 41.97 | 31.76 | 38.65 | 42.43 | 32.06 | 39.09 | 0.70 | 42.09 | 32.48 | 40.07 | 1.60 | 42.74 | 32.41 | 39.84 | 1.56 | 42.60 | 32.34 | 39.68 | 1.34 | 42.60 | 32.68 | 40.39 | 2.07 |

TABLE 5

NO$_x$ AND OZONE EXPOSURE

Color Change (DE*)

| Example | Cycles of Ozone Exposure | | | | | | Cycles of NOx Exposure | | | |
|---|---|---|---|---|---|---|---|---|---|---|
| | 1 | 2 | 3 | 4 | 6 | 8 | 1 | 2 | 3 | 4 |
| 1A | 1.09 | 1.60 | 1.38 | 0.87 | 1.56 | 1.71 | 1.32 | 2.32 | 2.67 | 2.39 |
| 1B | 1.29 | 0.89 | 0.80 | 1.03 | 1.34 | 0.72 | 0.86 | 1.25 | 1.32 | 1.21 |
| 1C | 0.36 | 0.19 | 0.53 | 0.72 | 0.32 | 0.84 | 0.13 | 0.78 | 0.52 | 0.97 |
| 1D | 0.36 | 0.50 | 0.37 | 0.54 | 0.38 | 0.47 | 0.32 | 0.35 | 0.43 | 0.56 |
| 1E | 1.05 | 0.67 | 0.51 | 0.70 | 1.12 | 0.46 | 0.97 | 0.92 | 0.53 | 1.12 |
| 1F | 0.62 | 0.68 | 0.84 | 0.87 | 0.82 | 0.96 | 0.59 | 1.02 | 0.64 | 0.34 |
| 1G | 0.69 | 2.34 | 1.68 | 1.64 | 2.58 | 2.45 | 1.58 | 1.88 | 2.40 | 2.19 |
| 1H | 0.84 | 1.32 | 0.78 | 0.98 | 1.60 | 1.36 | 1.51 | 0.93 | 1.08 | 1.43 |
| 1I | 0.15 | 0.57 | 0.43 | 0.92 | 1.05 | 0.82 | 0.55 | 0.56 | 1.03 | 0.66 |
| 2A | 1.19 | 1.49 | 2.25 | 1.76 | 2.54 | 3.18 | 1.07 | 2.04 | 2.78 | 2.20 |
| 2B | 0.29 | 0.92 | 0.62 | 3.00 | 0.86 | 1.20 | 0.79 | 0.43 | 0.82 | 0.90 |
| 2C | 0.89 | 1.00 | 0.92 | 0.98 | 1.32 | 0.95 | 0.46 | 1.04 | 0.60 | 1.15 |
| 2D | 1.46 | 0.26 | 0.38 | 0.92 | 0.56 | 0.70 | 1.09 | 0.69 | 0.52 | 0.78 |
| 2E | 0.49 | 0.50 | 0.63 | 0.93 | 0.90 | 0.35 | 0.87 | 0.69 | 0.82 | 0.78 |
| 2F | 2.24 | 2.35 | 2.78 | 1.69 | 2.30 | 2.33 | 1.75 | 2.52 | 2.32 | 3.21 |
| 2G | 2.80 | 3.01 | 3.69 | 3.93 | 2.95 | 3.79 | 3.78 | 3.46 | 3.34 | 3.30 |
| 2H | 1.13 | 1.76 | 2.34 | 1.30 | 2.92 | 2.09 | 3.65 | 3.30 | 3.52 | 4.01 |
| 2I | 1.75 | 2.15 | 2.40 | 2.40 | 2.96 | 3.08 | 2.81 | 3.00 | 3.13 | 2.30 |
| 3A | 0.54 | 0.69 | 0.80 | 1.33 | 1.41 | 2.33 | 1.33 | 1.27 | 1.54 | 1.59 |
| 3B | 0.21 | 0.42 | 1.70 | 0.79 | 1.61 | 1.00 | 0.48 | 0.51 | 0.78 | 0.86 |
| 3C | 0.83 | 0.23 | 0.48 | 0.02 | 0.35 | 0.82 | 0.38 | 0.52 | 0.93 | 0.39 |
| 3D | 0.37 | 0.47 | 0.39 | 0.48 | 0.30 | 0.36 | 0.73 | 0.52 | 0.77 | 0.27 |
| 3E | 0.41 | 0.59 | 0.34 | 0.39 | 0.23 | 0.43 | 0.35 | 0.92 | 0.41 | 0.39 |
| 3F | 1.53 | 1.48 | 2.29 | 1.14 | 1.53 | 1.44 | 1.06 | 1.89 | 1.95 | 1.09 |
| 3G | 0.73 | 1.63 | 1.84 | 2.01 | 2.39 | 2.41 | 1.38 | 1.38 | 2.04 | 1.59 |
| 3H | 0.68 | 1.01 | 1.29 | 0.63 | 1.15 | 0.50 | 0.58 | 1.07 | 1.06 | 0.81 |
| 3I | 0.12 | 0.48 | 0.52 | 0.88 | 0.77 | 0.81 | 0.76 | 0.46 | 0.32 | 0.55 |
| 4B | 4.17 | 4.76 | 2.95 | 3.09 | 3.99 | 3.66 | 3.66 | 4.12 | 3.65 | 3.10 |
| 4C | 0.33 | 0.82 | 0.92 | 0.58 | 0.73 | 0.62 | 0.93 | 0.82 | 0.59 | 1.28 |
| 4D | 0.56 | 0.50 | 0.51 | 0.83 | 1.13 | 0.90 | 0.94 | 0.68 | 0.81 | 0.68 |
| 4E | 0.26 | 0.36 | 0.19 | 0.17 | 0.24 | 0.46 | 0.35 | 0.31 | 0.27 | 0.11 |
| 4F | 0.98 | 0.87 | 1.13 | 1.14 | 2.19 | 3.05 | 2.16 | 2.76 | 1.81 | 2.73 |
| 4G | 1.99 | 3.07 | 2.90 | 3.38 | 2.95 | 4.05 | 3.21 | 3.49 | 3.26 | 3.59 |
| 5A | 1.07 | 1.79 | 1.04 | 0.60 | 1.26 | 1.25 | 1.38 | 1.70 | 1.85 | 0.99 |
| 5B | 0.36 | 0.29 | 0.74 | 0.53 | 0.69 | 0.72 | 0.50 | 0.69 | 1.08 | 1.03 |
| 5C | 1.18 | 0.94 | 1.71 | 0.41 | 1.05 | 4.67 | 4.57 | 4.12 | 3.65 | 4.48 |
| 5D | 2.57 | 2.48 | 2.83 | 1.97 | 2.63 | 2.52 | 2.29 | 2.78 | 2.59 | 2.67 |
| 5E | 0.11 | 0.54 | 0.31 | 0.98 | 1.09 | 0.88 | 0.53 | 0.70 | 1.20 | 0.48 |
| 5F | 0.11 | 0.40 | 0.17 | 0.58 | 0.51 | 0.40 | 0.33 | 0.37 | 0.72 | 0.43 |

As indicated by the retained tenacity data in TABLE 3, yarns made according to the present invention (Examples 3A–3I) are substantially as photostable as the yarns of Examples 2A–2I which were stabilized by copper compounds. FIG. 1 graphically illustrates the tenacity data presented in TABLE 3. High percent retained tenacity corresponds to low degradation on exposure to xenon light. Lower percent retained tenacity corresponds to increased degradation on exposure to xenon light. Yarns colored with zinc fenite tan and perylene red (pigment red 149), two strongly pro-degrading pigments, were surprising at least as stable to light exposure as yarns stabilized with copper compounds. Yarns made by the invention and colored with perylene pigments were as light stable as copper stabilized yarns even though perylene pigments have been reported to negate light stabilizing effects of HALS. In some cases, the stability of perylene colored yarns was dramatically improved.

As noted, yarns colored with pure iron oxide yarns are not considered within the scope of the present invention. Iron oxide red is a notoriously prodegrading pigment that is not usually used as a primary component of a colorant formulation Therefore, while pure iron oxide as a colorant is outside the scope of the present invention, yarns that are colored with blends of iron oxide and some other colorant are within the scope of the present invention. It is not considered limiting of the present invention that pure iron oxide is not within the scope since pure iron oxide is not a commercially important fiber colorant.

As shown in the xenon arc colorfastness data the present invention provides yarn that is colorfast to light without the presence of copper compounds. The larger the DE* value dte more the color has changed, i.e., the less colorfast the color. Exceptionally large color changes indicate unacceptable performance for most commercial applications where the fiber is exposed to UV light.

Another benefit with the present invention is that the elimination of copper compounds as stabilizers permits truer pigment coloration for certain pigments. For example, as shown in TABLE 4, the presence of copper effects perylene red's color before as well as after light exposure. For such pigments, yarns with copper are greener, bluer, and have lower chroma than those without.

EXAMPLE 6

Spinning Efficiency

Example 6A-Invention

Nylon 6 polymer modified with 2,2', 6,6'-tetrakylypiperidine using terephthalic acid as the chain regulator is melt colored a light gray. The light gray color is achieved using a concentrate to provide 0.3% by weight $TiO_2$, 0.001–0.1% by weight carbon black and 0.0001–0.1% by weight copper phthalocyanine in the spun fiber. The spinning efficiency is 97.6%.

Example 6B-Comparative

Example 6A is followed except that nylon 6 (not modified) is used instead of the modified nylon 6. Copper stabilizer is also added. The spinning efficiency is 95.2%.

The present invention improves spinning efficiency for light gray solution-dyed fibers by about 2.4%. Other colors may yield different results.

What is claimed is:

1. A process for making stabilized solution-dyed fiber comprising:

melting a polyamide which is amide monomers polymerized in the presence of at least one hindered piperidine compound having the formula:

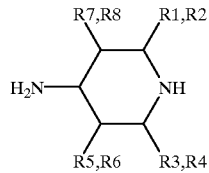

where R1, R2, R3 and R4 are not hydrogen, but any alkyl group having up to 20 carbon atoms, and R5, R6, R7 and R8 are alkyl substituents such as those present in R1–R4 or hydrogen;

coloring the melted polyamide with a colorant selected from the group consisting of:
pigments that are not pure iron oxide pigments;
dyes; and
mixtures thereof;

spinning the colored polyamide into fibers that have about 40% or better retained tenacity after 2125 kJ exposure to xenon arc radiation as per AATCC Test Method 16-1993, "Colorfastness to Light", Option E and no more than about 10 ppm uncomplexed copper.

2. The process of claim 1 wherein at least one hindered piperidine derivative is selected from the group consisting of:
4-amino-2,2',6,6'-tetramethylpiperidine;
4-(aminoalkyl)-2,2',6,6'-tetramethylpiperidine;
4-(aminoaryl)-2,2',6,6'-tetramethylpiperidine;
3-amino-2,2',6,6'-tetramethylpiperidine;
3-(aminoalkyl)-2,2',6,6'-tetramethylpiperidine;
3-(aminoaryl)-2,2'6,6'-tetramethylpiperidine;
2,2',6,6'-tetramethyl-4-piperidinecarboxylic acid;
2,2',6,6'-tetramethyl-4-piperidinealkylcarboxylic acid;
2,2',6,6'-tetramethyl-4-piperidinearylcarboxylic acid;
2,2',6,6'-tetramethyl-3-piperidinecarboxylic acid;
2,2',6,6'-tetramethyl-3-piperidinealkylcarboxylic acid; and
2,2',6,6'-tetramethyl-3-piperidinearylcarboxylic acid.

3. The process of claim 1 wherein said amide monomers are polymerized in the presence of at least one mono or dicarboxylic acid chain regulator selected from the group consisting of:

terephthalic acid;
adipic acid;
acetic acid;
propionic acid;
benzoic acid;
isophthalic acid;
sebacic acid;
napththalene 2,6-dicarboxylic acid; and
combinations thereof.

4. The process of claim 3 wherein the hindered piperidine derivative is 4-amino-2,2',6,6'-tetramethyl piperidine.

5. The process of claim 1 wherein the hindered piperidine derivative is present at about 0.05 to about 20% by weight of the polyamide.

6. The process of claim 1 wherein the starting monomers are ε-caprolactam monomers and the polyamide is a modified nylon 6 polymer.

7. The process of claim 2 wherein the starting monomers are ε-caprolactam monomers and the polyamide is a modified nylon 6 polymer.

8. The process of claim 1 wherein said coloring uses colorant selected from the group consisting of:
perylene red;
perylene maroon;
up to about 1.5% iron oxide red;
zinc ferrite tan; and
mixtures thereof.

9. The process of claim 1 wherein the fibers are free from copper compounds.

10. The process of claim 3 wherein said spinning is at least about 0.5% more efficient than spinning solution-dyed fibers from polyamide which is not polymerized in the presence of a mono or dicarboxylic acid chain regulator and at least one hindered piperidine derivative and which is colored with the same colorants.

11. An improved process for spinning solution-dyed nylon fibers comprising:

coloring a molten polyamide, which polyamide is ε-caprolactam polymerized in the presence of at least one hindered piperidine derivative having the formula:

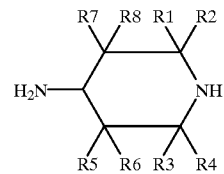

where R1, R2, R3 and R4 are not hydrogen, but any alkyl group having up to 20 carbon atoms, and R5, R6, R7 and R8 are alkyl substituents such as those present in R1–R4 or hydrogen; and spinning the colored polyamide into fibers that have about 40% or better retained tenacity after 500 hours exposure to xenon arc radiation as per AATCC Test Method 16-1993, "Colorfastness to Light," Option E wherein said spinning is at least 0.5% more efficient than spinning solution-dyed fibers colored with the same colorant from a polyamide which is not polymerized in the presence of at least one hindered piperidine derivative.

12. The process of claim 11 wherein said amide monomers are polymerized in the presence of at least one mono or dicarboxylic acid chain regulator selected from the group consisting of:

terephthalic acid;
adipic acid;
acetic acid;
propionic acid;
benzoic acid;
isophthalic acid;
sebacic acid;
napththalene 2,6-dicarboxylic acid; and
combinations thereof.

13. The process of claim 12 wherein said coloring is accomplished using a colorant selected from the group consisting of:
perylene red;
perylene maroon;
up to about 1.5% iron oxide red;
zinc ferrite tan; and
mixtures thereof.

14. The process of claim 12 wherein the hindered piperidine derivative compound is 4-amino-2,2',6,6'-tetramethyl piperidine.

15. The process of claim 14 wherein the hindered piperidine derivative compound is present at about 0.05 to about 2.0% by weight of the polyamide.

16. The process of claim 15 wherein said colorant is a pigment selected from the group consisting of:
perylene red;
perylene maroon;
zinc ferrite tan;
up to about 1.5% iron oxide red; and
mixtures thereof.

* * * * *

UNITED STATES PATENT AND TRADEMARK OFFICE
CERTIFICATE OF CORRECTION

PATENT NO. : 6,358,458 B1
DATED : March 19, 2002
INVENTOR(S) : S. A. McIntosh, H. Y. Hu, B. J. Bailey and O. K. Gannon It is certified that error appears in the above-identified patent and that said Letters Patent is hereby corrected as shown below:

Column 16,
Line 13, please delete "20%" after "about" and replace it with -- 2.0% --.

Signed and Sealed this

Third Day of September, 2002

Attest:

Attesting Officer

JAMES E. ROGAN
Director of the United States Patent and Trademark Office